United States Patent [19]
Krause et al.

[11] Patent Number: 5,269,145
[45] Date of Patent: Dec. 14, 1993

[54] HEAT STORAGE SYSTEM WITH COMBINED HEAT STORAGE DEVICE

[75] Inventors: Siegfried Krause, Ostelsheim; Friedrich Lindner, Leinfelden-Echterdingen, both of Fed. Rep. of Germany

[73] Assignee: Deutsche Forschungsanstalt fuer Luft- und Raumfahrt e.V., Bonn, Fed. Rep. of Germany

[21] Appl. No.: 902,656

[22] Filed: Jun. 23, 1992

[30] Foreign Application Priority Data

Jun. 28, 1991 [DE] Fed. Rep. of Germany ....... 4121460

[51] Int. Cl.⁵ .............................................. F01K 3/00
[52] U.S. Cl. .................... 60/659; 60/641.15; 126/618
[58] Field of Search ............ 60/652, 659, 641.8, 60/641.15; 126/617, 618, 400

[56] References Cited

U.S. PATENT DOCUMENTS 2,933,885  4/1960  Benedek et al. .................. 60/659

FOREIGN PATENT DOCUMENTS

2458961  6/1976  Fed. Rep. of Germany .
285498   7/1928  United Kingdom ............... 60/659

*Primary Examiner*—Stephen F. Husar
*Attorney, Agent, or Firm*—Barry R. Lipsitz

[57] ABSTRACT

In order to improve a heat storage system, comprising a heat source, a heat storage device and a heat sink, between which heat is transferred by means of a heat transporting medium, such that a steam-powered engine which is to be operated with overcritical steam of the heat transporting medium can be operated with an inexpensive and simple construction of the heat storage system, it is suggested that the heat sink comprise a steam-powered engine to be operated with overcritical steam of the heat transporting medium, that the heat storage device comprise a Ruths storage device storing the heat transporting medium condensed in the form of a liquid bath and having a storage temperature below the critical temperature of the heat transfer medium and a superheat storage device connected with the Ruths storage device and having a storage temperature above the critical temperature of the heat transporting medium, that the heat storage system be operable during discharge such that in the Ruths storage device steam result from the liquid bath of the heat transporting medium with a temperature corresponding to the storage temperature in the Ruths storage device, and that the steam subsequently flow through the superheat storage device and be heated thereby to a temperature above the critical temperature and then flow into the steam-powered engine.

24 Claims, 3 Drawing Sheets

HEAT STORAGE SYSTEM WITH COMBINED HEAT STORAGE DEVICE

The invention relates to a heat storage system comprising a heat source, a heat storage device and a heat sink or absorber, between which heat is transferred by means of a heat transporting medium.

Such heat storage systems are known.

In heat storage systems of this type, problems can, however, occur when the heat sink or absorber is a steam-powered engine which is to be operated with overcritical steam of the heat transporting medium since, in this case, heat storage is not possible or is ineffective in the steam storage devices previously known.

The object underlying the invention is therefore to improve a heat storage system of the generic type such that a steam-powered engine which is to be operated with overcritical steam of the heat transporting medium can be operated with an inexpensive and simple construction of the heat storage system.

This object is accomplished in accordance with the invention, in a heat storage system of the type described at the outset, in that the heat sink is a steam-powered engine to be operated with overcritical steam of the heat transporting medium, that the heat storage device comprises a Ruths storage device storing the heat transporting medium condensed in the form of a liquid bath and having a storage temperature below the critical temperature of the heat transfer medium and a superheat storage device connected with the Ruths storage device and having a storage temperature above the critical temperature of the heat transporting medium, that the heat storage system is operable during discharge such that in the Ruths storage device steam results from the liquid bath of the heat transporting medium with a temperature corresponding to the storage temperature in the Ruths storage device, and that the steam subsequently flows through the superheat storage device and is heated thereby to a temperature above the critical temperature and then flows into the steam-powered engine.

The advantage of the inventive solution is to be seen in the fact that a combined heat storage device has been created in a simple manner by the combination of a superheat storage device with a Ruths storage device and with this heat storage device overcritical steam can be made available for a steam-powered engine to be operated with this steam in an effective and inexpensive manner.

The Ruths storage device used in accordance with the invention can, in principle, be a simple Ruths storage device in the proposed solution, i.e. a storage device which stores the heat transporting medium in condensed form. It is even more advantageous, in particular for increasing the storage capacity of the Ruths storage device, for this Ruths storage device to have a latent heat storage material arranged in the liquid bath thereof.

In the same way, the superheat storage device according to the inventive principle can be of the most varied type and design. However, in this case it is also particularly advantageous for the superheat storage device to be a latent heat storage device, i.e. to comprise a latent heat storage material.

The most varied possibilities could be considered as heat source in the inventive solution. For example, it is conceivable to use the hot exhaust air resulting during steel production as heat source. However, an inventive heat storage system is particularly suitable when the heat source is fed by solar energy since this ensures a simple, inexpensive and effective storage of solar energy.

In addition, it has proven to be particularly expedient, especially in conjunction with the use of solar energy, for the heat source to be a receiver of solar concentrators since, in such an arrangement, the solar energy can be effectively converted into heat energy.

In the above, it has already been described as advantageous for the Ruths storage device to have latent heat storage material arranged in its liquid bath. In such an advantageous solution of the invention it is, furthermore, particularly favorable for the Ruths storage device to be operable such that the liquid bath of the heat transporting medium, during discharge, always surrounds the latent heat storage material essentially with heat contact. This is especially advantageous since, in this case, it is ensured that the latent heat storage material, during discharge, always passes its heat to the liquid bath as effectively as possible and therefore the heat serves to generate the steam from the liquid bath of the condensed heat transporting medium. If, on the other hand, this condition were not always fulfilled, a part of the latent heat storage material would, from time to time, no longer be surrounded by the liquid bath, although this storage material has still stored and can transfer heat. This means that the heat stored in this part of the latent heat storage material could no longer contribute to the vaporization of the condensed heat transporting medium and, at the most, could effect an additional heating up of the steam which would, however, be far less effective.

Within the scope of the inventive principle explained in the above, there are various possibilities for designing the inventive heat storage system further. In one advantageous alternative, the heat storage system has a discharge circuit comprising the Ruths storage device and the superheat storage device as well as the heat sink. This circuit conveys vaporous heat transporting medium from the Ruths storage device to the superheat storage device and subsequently to the heat sink and returns heat transporting medium condensed in the heat sink in liquid form to the Ruths storage device and introduces this to the liquid bath thereof.

By providing a discharge circuit of this type, it is possible to manage with a small amount of condensed heat transporting medium since the amount of the condensed heat transporting medium which is present in the liquid bath can be conveyed repeatedly through the discharge circuit to transport the entire heat stored in the latent heat storage material of the Ruths storage device to the heat sink and, at the same time, also utilize the entire heat stored in the latent heat storage material of the superheat storage device.

In order to ensure a return, in particular of the condensed heat transporting medium, to the Ruths storage device, a discharge pump is advantageously provided in the discharge circuit.

Moreover, it is of advantage, also in order to manage with a small amount of condensed heat transporting medium, for the heat storage system to comprise a charge circuit including the heat source and the superheat storage device as well as the Ruths storage device. This charge circuit conveys liquid heat transporting medium from the liquid bath of the Ruths storage device to the heat source and returns heat transporting medium vaporized by the heat source through the superheat storage device to the Ruths storage device and passes this to the liquid bath of the latter for condensation.

Due to repeated circulation of the amount of condensed heat transporting medium present in the liquid bath, the superheat storage device, in particular with the latent heat storage material, and the Ruths storage device with its latent heat storage material are completely charged.

Also in order to maintain a circulation of the condensed heat transporting medium in this charge circuit, a charging pump is advantageously provided in the charge circuit.

In an alternative embodiment to the heat storage system comprising a discharge circuit and a charge circuit, an additional storage device for liquid heat transporting medium maintained at the storage temperature of the Ruths storage device is associated with the Ruths storage device. During discharge of the Ruths storage device liquid heat transporting medium is supplied from the additional storage device to the liquid bath so that this, during discharging, always surrounds the latent heat storage material essentially with heat contact and the vaporized heat transporting medium flows through the superheat storage device for subsequent heating before it enters the steam-powered engine.

The advantage of this solution is to be seen in the fact that it is no longer necessary to provide a discharge and a charge circuit but that a complete charging of the latent heat storage material in the Ruths storage device and also, for example, in the superheat storage device can be achieved due to the fact that a larger amount of condensed heat transporting medium is used. However, during charging of the Ruths storage device, this is not stored completely therein but in the additional storage device associated with the Ruths storage device and, during discharging, again allowed to flow from the additional storage device into the Ruths storage device in order to utilize the entire heat stored in the latent heat storage material during the discharging process. Moreover, this also provides the possibility of using the entire heat stored in the latent heat storage material of the superheat storage device completely in the steam-powered engine.

In this respect it is particularly favorable for an additional pump to be provided between the additional storage device and the Ruths storage device in order to convey liquid heat transporting medium to the liquid bath from the additional storage device. With this pump it is possible to maintain the liquid bath in a simple manner to the extent that this surrounds the latent heat storage material essentially with heat contact. Preferably, a sensor is also provided in the Ruths storage device and the pump controlled via a control means so that the pump always maintains the liquid bath in the aforementioned extent.

In this respect it is particularly advantageous for the additional storage device, during charging of the Ruths storage device, to be fillable with liquid heat transporting medium at or close to the storage temperature of the Ruths storage device. The embodiment is designed, in particular, such that liquid, condensed heat transporting medium can be conveyed from the Ruths storage device to the additional storage device, i.e. the vaporous heat transporting medium coming from the superheat storage device is first introduced into the Ruths storage device, there transfers its heat to the liquid bath and, in particular, also to the latent heat storage material in the liquid bath, is hereby condensed and then introduced in condensed form into the additional storage device and stored.

Since, in this embodiment, the condensed heat transporting medium is not circulated during charging and discharging, it is advantageous for condensed heat transporting medium to be suppliable to the heat source during charging from a condensate tank and for heat transporting medium vaporized by the heat source to be introduceable into the Ruths storage device for condensation via a charge line through the superheat storage device. This means that the condensate tank serves in an advantageous manner to make an adequate quantity of heat transporting medium available for complete charging of the superheat storage device and the Ruths storage device.

Moreover, it is advantageous for a condensate feed line to be provided between the heat sink and the heat source and condensed heat transporting medium is transportable in this line from the heat sink to the heat source, whereby, in particular, the condensate tank for the condensed heat transporting medium is provided in an advantageous manner in the condensate feed line.

In an additional, advantageous embodiment of the inventive solution, provided as an alternative to the additional storage device associated with the Ruths storage device, the Ruths storage device has an additional storage volume for liquid heat transporting medium, into which the liquid heat transporting medium enters when, during charging, the latent heat storage material is surrounded by the liquid bath essentially with heat contact, and, during discharging, the maximum amount of the liquid transporting medium vaporizable in the Ruths storage device is such that the additional storage volume is emptied but the liquid bath still continues to surround the latent heat storage material essentially with heat contact.

This embodiment of the inventive solution also dispenses with a charging and a discharging circuit. However, the amount of heat transporting medium required to completely charge the superheat storage device and the Ruths storage device is not stored in the additional storage device but in the additional storage volume provided in the Ruths storage device.

In this respect it is expedient for condensed heat transporting medium to be suppliable to the heat source from a condensate tank and for heat transporting medium vaporized by the heat source to be introduceable into the liquid bath of the Ruths storage device by means of a charge line through the superheat storage device.

Moreover, it is expedient for a discharge line to be provided, with which vaporous heat transporting medium can be supplied from the additional storage volume of the Ruths storage device to the heat sink.

In order to be able to temporarily store the heat transporting medium condensed after the heat sink, it is advantageous for a condensate feed line to be provided between the heat sink and the heat source, with which condensed heat transporting medium can be supplied to the heat source.

It has proven to be particularly expedient in this respect for the condensate tank to be provided in the condensate feed line.

Moreover, in order to maintain a flow of the condensed heat transporting medium into the heat source, a charging pump is advantageously provided in the condensate feed line.

In all the embodiments so far, the possibility is intended to be created of introducing vaporous heat transporting medium directly into the heat sink, i.e. the steam-powered engine, by-passing the combined heat storage device. For this reason, a connecting line is advantageously provided between the charge line and the discharge line.

Water is preferably used as heat transporting medium since this offers the most favorable possibilities from an ecological point of view of constructing an inventive heat storage system, in particular in conjunction with the utilization of solar energy.

Alternatively, it is in principle possible to use, in particular, toluene as heat transporting medium, which is used as operating medium in solar-operated turbines in the interests of higher temperatures and efficiency.

Additional features and advantages are the subject matter of the following description as well as of the drawings of several embodiments. In these drawings.

Figure 1:
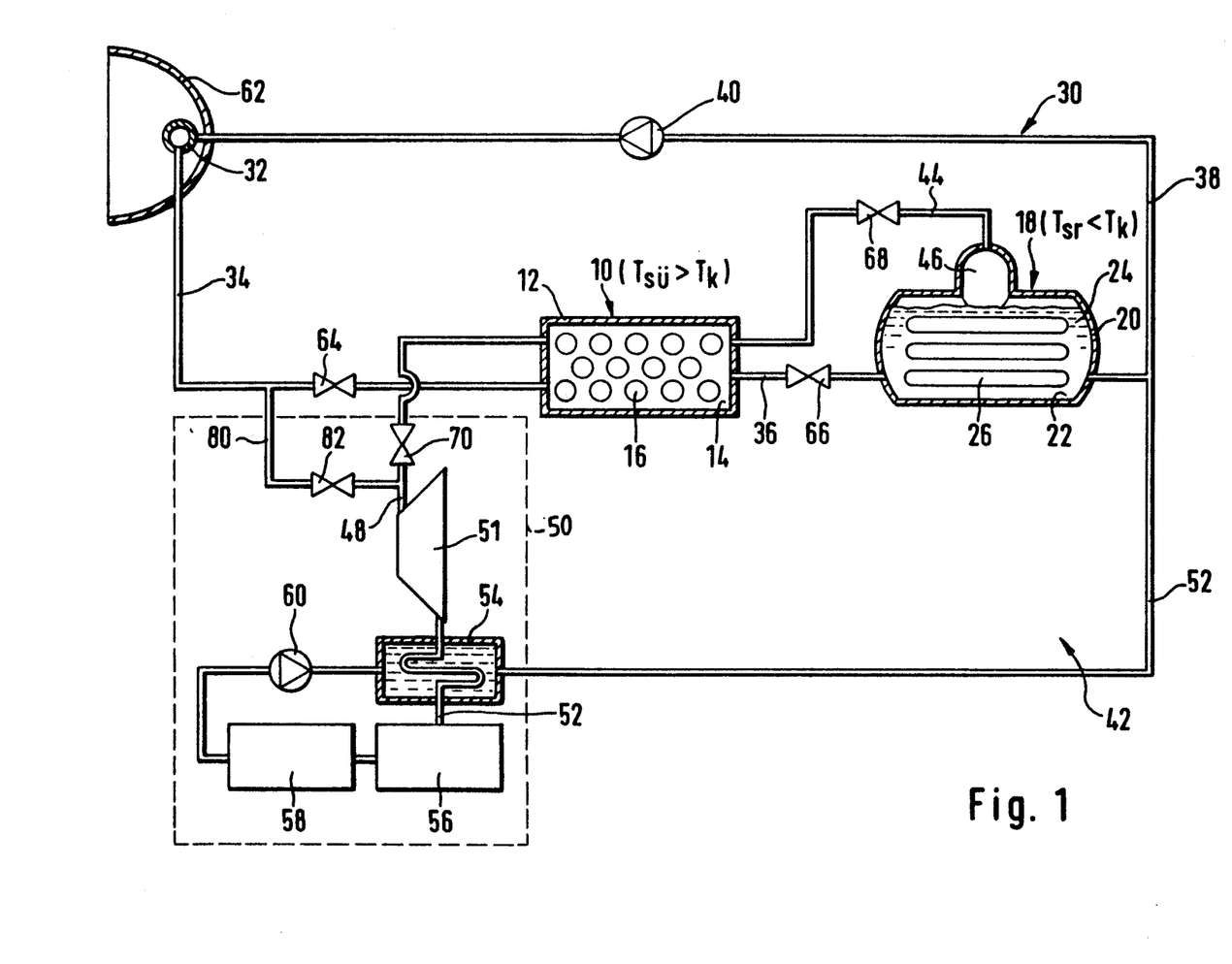
FIG. 1 is a schematic illustration of a first embodiment of the inventive heat storage system.

A first embodiment of an inventive heat storage system, illustrated in FIG. 1, comprises a superheat storage device 10, which comprises a storage tank 12. This storage tank 12 encloses, for its part, a storage volume 14 in which a latent heat storage material 16 is arranged.

The superheat storage device 10 with the latent heat storage material is dimensioned such that its storage temperature $T_{su}$ is above the critical temperature $T_k$ of a heat transporting medium, with which the inventive heat storage system operates. This means that the temperature $T_{su}$ is determined in the specified manner by the equilibrium temperature of the latent heat storage material 16.

In addition, the inventive heat storage device comprises a Ruths storage device 18, comprising a storage tank 20 which, for its part, encloses a storage volume 22. The heat transporting medium of the inventive heat system is at least partially stored in this storage volume 22 in a condensed form, i.e. in the form of a liquid bath 24. Latent heat storage material 26 is arranged in this liquid bath 24 and this latent heat storage material 26 is constantly surrounded by the liquid bath 24 essentially with heat contact.

The storage temperature $T_{sr}$ of the Ruths storage device is selected such that it is below the critical temperature $T_k$ of the heat transfer medium and, in this respect, preferably slightly below the critical temperature $T_k$.

The combination of the superheat storage device 10 and the Ruths storage device 18 is arranged for charging in a charge circuit 30 which comprises a heat source 32, a first charge line 34 leading from the heat source to the superheat storage device 10, a second charge line 36 leading from the superheat storage device 10 to the Ruths storage device 18 and a charge return line 38 which leads back from the Ruths storage device 18 to the heat source 32 and in which a charge pump 40 is arranged. The second charge line 36 and the charge return line 38 preferably open into a lower region of the storage tank 20 of the Ruths storage device 18.

The superheat storage device 10 and the Ruths storage device 18 are, in addition, tied into a discharge circuit 42. This discharge circuit 42 comprises a first discharge line 44 which leads away from a steam dome 46 of the storage tank 20, which rises above the liquid bath 24, to the superheat storage device 10, a second discharge line 48, which leads from the superheat storage device 10 to a heat sink 50 requiring overcritical steam of the heat transporting medium, the heat sink 50 preferably being a steam turbine, and a discharge return line 52 which leads from the heat sink 50 to the Ruths storage device 18 and hereby preferably opens into the charge return line 38 between the Ruths storage device 18 and the charge pump 40.

Between the discharge lines 48 and 52 the discharge circuit 42 passes through the characteristic components of the heat sink 50, in the case of a steam turbine system as heat sink 50 customarily a steam turbine 51, a regenerator 54, a cooler 56, a condensate tank 58, a discharge pump or a compressor 60 and again the regenerator 54.

The first embodiment of the inventive heat storage system operates as follows:

For charging the superheat storage device 10 and the Ruths storage device 18 via the charge circuit 30, heat transporting medium is vaporized in the heat source 32, which is preferably designed as receiver of a solar concentrator 62, and conveyed through the first charge line to the superheat storage device 10. A charge valve 64 provided in addition in the first charge line is in this case open.

The heat transporting medium is heated in the heat source to a temperature T which is preferably above the temperature $T_{su}$ but at least equal thereto. This means that when the vaporous heat transporting medium flows through the superheat storage device 10 the latent heat storage material 16 is heated to the storage temperature $T_{su}$ or a temperature above this.

After flowing through the superheat storage device 10, the vaporous heat transfer medium is introduced into the Ruths storage device via the second charge line 36. A stop valve 66 in the second charge line 36 is, in this case, also open.

The vaporous heat transfer medium entering the Ruths storage device 18, in particular the liquid bath 24 thereof, now transfers its heat to this liquid bath 24 and this, for its part, to the latent heat storage material 26, whereby the vaporous heat transporting medium condenses.

At the same time, liquid heat transporting medium flows out of the liquid bath 24 via the charge return line 38, helped by the charge pump 40 in this line, and into the heat source 32 so as to be vaporized again therein.

The charge circuit 30 creates the possibility of heating the latent heat storage medium 26 in the Ruths storage device 18 completely, in particular in the case where the storage temperature $T_{sr}$ of the Ruths storage device is below the critical temperature of the heat transporting medium but close thereto. In this case, it is possible to have the condensed heat transporting medium stored in the liquid bath 24 flowing repeatedly through the charge circuit 30 in order to charge the latent heat storage material 26 in the Ruths storage device 18 completely.

During charging of the superheat storage device 10 and the Ruths storage device 18, a stop valve 68 in the first discharge line 44 and a discharge valve 70 in the second discharge line 48 are preferably closed.

On the other hand, during discharging of the Ruths storage device 18 and the superheat storage device 10 the charge valve 64 and the stop valve 66 are closed and the stop valve 68 and the discharge valve 70 open.

In this case, liquid heat transporting medium of the liquid bath 24 is vaporized first of all by a drop in pressure and enters the steam dome 46 in steam form and from there it is passed to the superheat storage device 10 via the first discharge line 44.

The vaporous heat transporting medium coming from the Ruths storage device 18 has the temperature $T_{sr}$, which is below the critical temperature $T_k$ of the heat transporting medium. Since, however, the heat sink requires overcritical steam, this steam coming from the Ruths storage device 18 with the temperature $T_{sr}$ is heated in the superheat storage device, while flowing therethrough, to the temperature $T_{su}$ which is above the critical temperature, and is then conveyed by the second discharge line 48 into the heat sink 50, in which the heat transporting medium is then available as overcritical steam.

In the steam turbine 51 requiring overcritical steam in the heat sink 50, the heat transporting medium is generally condensed only to a partial extent. The remaining condensation generally takes place during the preliminary cooling of the heat transporting medium in the regenerator 54 and the cooler 56 so that, finally, only condensed heat transporting medium is present in the condensate tank 58. This now flows once more through the regenerator 54 and the discharge return line 52 and is conveyed by the discharge pump 60 towards the Ruths storage device 18. The condensed heat transporting medium flows into the Ruths storage device 18 via the charge return line 38 since, in this case, the charge pump 40 is not in operation. The condensed heat transporting medium passed again into the Ruths storage device 18, i.e. its liquid bath 24, can yet again absorb heat from the latent heat storage material 26 so that the liquid bath 24 continues to be able to transfer heat transporting medium in steam form via the first discharge line 44.

It is also ensured due to this discharge circuit 42 that many times the volume of the liquid bath 24 can flow through the discharge circuit so that the entire heat capacity of the latent heat storage material 26 in the Ruths storage device 18 and of the latent heat storage material 16 in the superheat storage device 10 is utilized.

In order to allow, in addition, a direct operation, i.e. a direct connection between the heat source 32 and the heat sink 50, in the inventive heat storage system, a connecting line 80 is provided between the first charge line 34 and the second discharge line 48. This connecting line can be shut off by a valve 82. In this respect, the connecting line opens into the first charge line 34 between the heat source 32 and the charge valve 64 and into the second discharge line 48 between the steam turbine 51 and the discharge valve 70.

When the valve 82 is open and the charge valve 64 as well as the discharge valve 70 closed, a direct operation of the steam turbine 51 is possible with vaporous heat transporting medium from the heat source 32.

Preferably, water is used as heat transporting medium and this is advantageous, in particular, with a receiver as heat source 32 and a heat sink 50 comprising a steam turbine.

Figure 2:
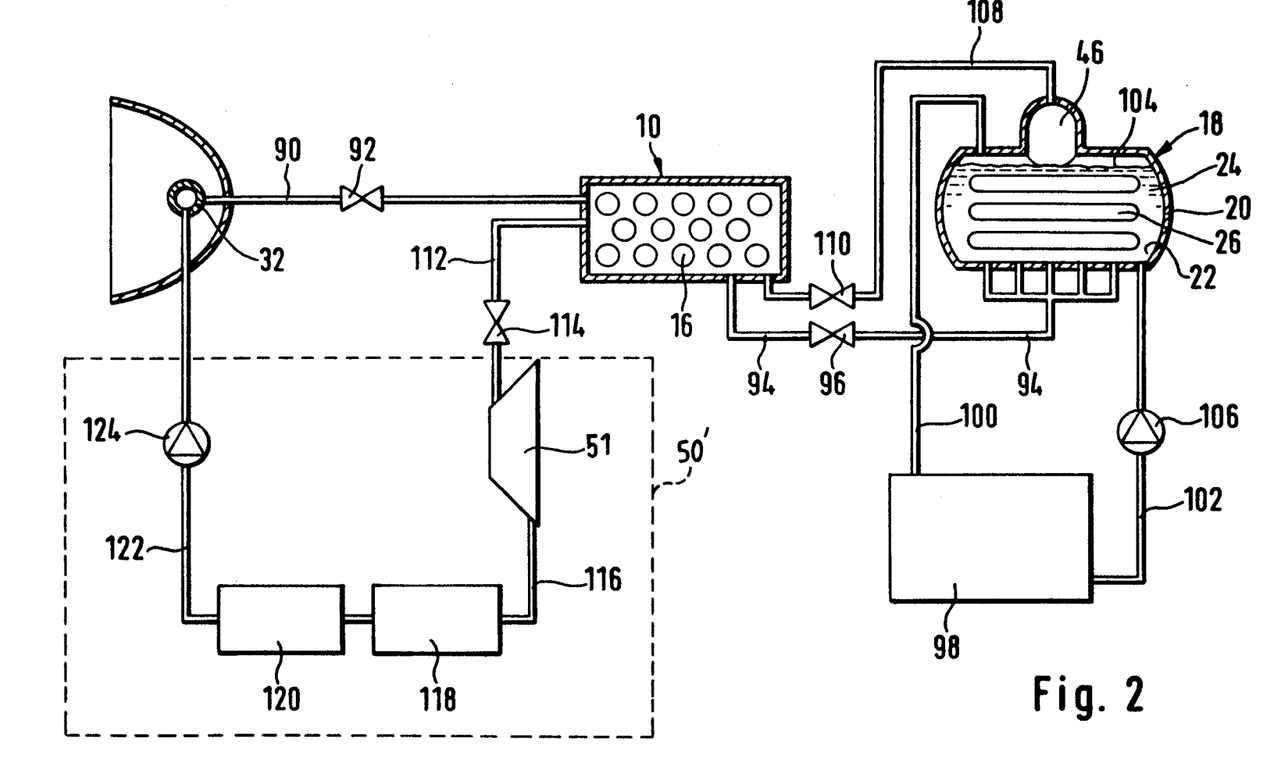
FIG. 2 is a schematic illustration of a second embodiment of the inventive heat storage system and FIG. 3 is a schematic illustration of a third embodiment of the inventive heat storage system.

In a second embodiment of an inventive heat storage system, illustrated in FIG. 2, the superheat storage device 10 and the Ruths storage device 18 are of identical design to those of the first embodiment and so the same parts have been given the same reference numerals and, in this respect, reference is made to the explanations concerning the first embodiment.

Moreover, the heat source 32 and the steam turbine 51 are of identical design to those of the first embodiment and so reference is made to the comments hereon.

In contrast to the first embodiment, no charge circuit and no discharge circuit are provided.

In the second embodiment illustrated in FIG. 2, a first charge line 90 leads from the heat source 32 to the superheat storage device 10, whereby a charge valve 92 is arranged in this first charge line 90. In addition, a second charge line 94 leads from the superheat storage device 10 to the Ruths storage device 18 and opens in a lower region of the storage tank 20, whereby a stop valve 96 is provided in this second charge line 94.

Furthermore, an additional storage device 98 is associated with the Ruths storage device 18 and this communicates with the Ruths storage device 18 via a feed line 100 and a return line 102. The feed line 100 is preferably arranged such that when the liquid bath 24 exceeds a maximum liquid level 104 in the storage tank 20, condensed heat transporting medium flows into the additional storage device 98 via the feed line 100. The return line 102 is designed such that it is able to pass condensed heat transporting medium from the additional storage device 18, preferably by means of an additional pump 106, into the liquid bath 24 of the storage tank 20.

The storage tank 20 of the Ruths storage device 18 comprises, in addition, a steam dome 46, from which a first discharge line 108 comprising a stop valve 110 leads into the superheat storage device 10. In addition, a second discharge line 112 comprising a discharge valve 114 leads from the superheat storage device 10 to the heat sink 50' and, therein, to the steam turbine 51.

In the heat sink 50', a return line 116 leads from the steam turbine 51 to a cooler 118 and through this to a condensate tank 20. A condensate line 122 with a charge pump 124 arranged therein then leads from this condensate tank 120, away from the heat sink 50' to the heat source 32.

The second embodiment functions as follows:

Heat transporting medium is vaporized by the heat source 32 and this steam supplied via the first charge line 90, with the charge valve 92 open, to the superheat storage device 10, the steam hereby having a temperature T which, exactly as in the first embodiment, is at least equal to the temperature $T_{su}$ or preferably above this. After charging of the latent heat storage material 16 in the superheat storage device 10, the steam flows through the second charge line 94, with the stop valve 96 open, and enters the Ruths storage device 18, i.e. in the liquid bath 24 thereof. Due to contact with the liquid bath 24, the steam transfers its heat hereto and the liquid bath 24, for its part, heats the latent heat storage material 26. The steam preferably condenses hereby to liquid.

Since, due to the condensation of the steam, the liquid level 104 would rise and the storage volume 22 provided for it would be exceeded, excess liquid heat transporting medium is conveyed through the feed line 100 into the additional storage device 98 and stored herein. The additional storage device 98 is dimensioned such that the amount of liquid heat transporting medium which can be stored is that necessary to completely charge the latent heat storage material 26 in the Ruths storage device 18.

When the superheat storage device 10 is charged and the Ruths storage device 18 is charged, the charge valve 92 and the stop valve 96 are closed and the stop valve 110 as well as the discharge valve 114 are opened for discharging. Due to a drop in pressure, heat transporting medium vaporizes out of the liquid bath 24, enters the steam dome 46 and is conveyed by the discharge line 108 into the superheat storage device 10. This steam coming from the Ruths storage device 18 has the temperature $T_{sr}$ and is heated in the superheat storage device to the temperature $T_{su}$ so that the steam, after leaving the superheat storage device 10, enters the heat sink 50 through the second discharge line 112 with the temperature $T_{su}$.

The overcritical steam passed by the second discharge line 112 into the heat sink 50', i.e. preferably the steam turbine 51 now works in the heat sink 50', transfers part of its heat but exits the steam turbine 51 partially still as steam and enters the return line 116. In the cooler 118, this steam is then completely condensed and reaches the condensate tank 120, in which the condensed heat transporting medium is temporarily stored, and for such a time until the superheat storage device 10 and the Ruths storage device 18 are charged again. For this purpose, the charge pump 124 is switched on and conveys condensed heat transporting medium from the condensate tank via the condensate line 122 into the heat source 32, in which the heat transporting medium is vaporized, the steam hereby having the aforementioned temperature T.

It is possible to discharge the superheat storage device 10 and the Ruths storage device 18 for as long as condensed heat transporting medium can be conveyed from the additional storage device 98 by means of the pump 106, via the return line 102 into the storage tank 20 in order to ensure that the liquid bath 24 always surrounds the latent heat storage material 26 in the storage tank 20 with heat contact. Therefore, the entire latent heat storage material 26 is able to transfer the stored heat to the liquid bath 24, from which vaporous heat transporting medium then results which is conveyed via the discharge line 108 to the superheat storage device 10.

In accordance with the invention, the discharging is terminated when the liquid level 104 threatens to sink to such an extent that the latent heat storage material 26 is no longer surrounded essentially completely by the liquid bath 24 since, in this case, a good transfer of heat from the latent heat storage material 26 to the heat transporting medium would not be adequately ensured.

Figure 3:
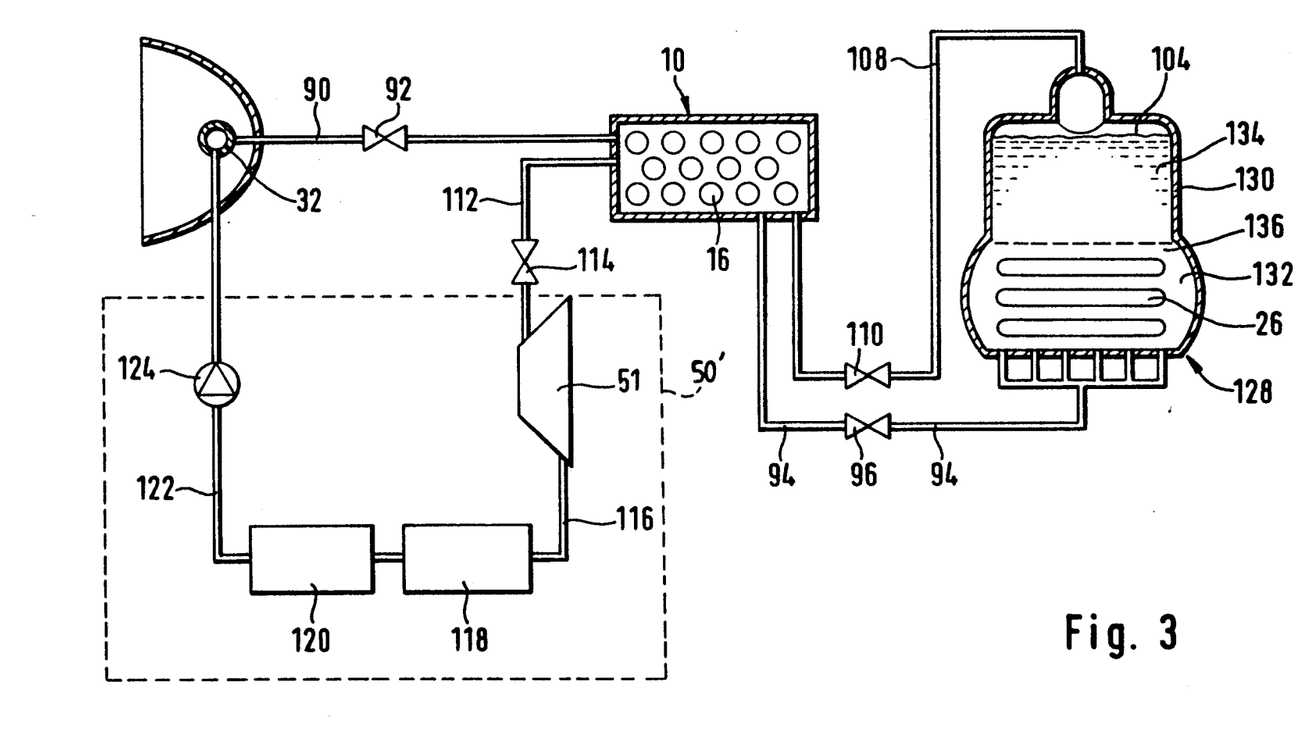

In a third embodiment, illustrated in FIG. 3, those parts which are identical to those of the second and the first embodiments have been given the same reference numerals and so with respect to the description of these parts reference can also be made to the explanations concerning the first and second embodiments.

In contrast to the second embodiment, the Ruths storage device 128 is of a different design and no additional storage device is required.

The Ruths storage device 128 comprises a storage tank 130 which includes a basic volume 132 and an additional storage volume 134. The basic volume 132 also includes the latent heat storage material 26 whereas no latent heat storage material 26 is provided in the additional storage volume 134.

The liquid bath 136 in the storage tank 130 covers, in accordance with the invention, at least the basic volume 132 and can extend into the additional storage volume 134, which is preferably located above the basic volume 132, according to the charge state of the Ruths storage device 128.

During charging of the heat storage system according to the third embodiment, the same procedure as in FIG. 2 is, in principle, used. In the third embodiment, the additional liquid resulting from the condensation of the vaporous heat transporting medium in the liquid bath 136 remains in the liquid bath 136 which, for this purpose, can extend into the additional storage volume 134. The additional storage volume 134 is designed such that it can store a sufficient amount of liquid heat transporting medium which is required to charge both the latent heat storage material 16 in the superheat storage device 10 and the latent heat storage material 26 in the Ruths storage device 128 completely.

A discharging of the third embodiment of the inventive heat storage system is carried out in such a manner that heat transporting medium vaporizes out of the liquid bath 136 and is conveyed via the first discharge line 108 into the superheat storage device 10, the procedure being the same as in the second embodiment.

This vaporization of heat transporting medium out of the liquid bath 136 is possible for such a time until the liquid level 104 in the additional storage volume 134 sinks as far as the basic volume 132, i.e. the liquid bath 136 only fills the basic volume 132, in which the latent heat storage material 26 is arranged.

An additional discharging of the Ruths storage device 128 is not provided for in an inventive manner in order to ensure that during the entire discharge process the latent heat storage material 26 can transfer the stored heat to the liquid bath 136, from which the heat transporting medium is vaporized.

Otherwise, the third embodiment operates in an identical manner to the second embodiment and so with respect to the function of the remaining components reference can be made to the explanations concerning the second embodiment.

The heat transporting medium is preferably water in both the second and third embodiments.

Customary, known latent heat storage materials selected as latent heat storage materials 16 and 26 must be adapted to the respective heat transporting medium and the desired storage and user temperatures. Examples of such latent heat storage materials are $NaNO_3$, $Na_2N_2O_2$, $NaOH$, $ZnCl_2$, $AlCl_3$, $FeCl_3$, $LiNO_3$, $Bi$, $Cd$.

The present disclosure relates to the subject matter disclosed in German application No. P 41 21 460.9 of Jun. 28, 1991, the entire specification of which is incorporated herein by reference.

We claim:

1. A heat storage system for storing heat from a heat source and transferring the heat using a heat transporting medium to a heat sink such as a steam-powered engine that operates with overcritical steam of said heat transporting medium, said heat storage system comprising:

a Ruths storage device for storing said heat transporting medium condensed in the form of a liquid bath, said Ruths storage device having a storage temperature below a critical temperature of said heat transporting medium, and     a superheat storage device connected with said Ruths storage device and having a storage temperature above the critical temperature of the heat transporting medium;

said heat storage system having a discharge cycle in which the Ruths storage device provides steam from the liquid bath of said heat transporting medium with a temperature corresponding to the storage temperature of the Ruths storage device, said steam subsequently flowing through the superheat storage device to be heated to a temperature above the critical temperature for input to the heat sink.

2. A heat storage system as defined in claim 1, wherein said heat storage system has a discharge circuit comprising said Ruths storage device, the superheat storage device and the heat sink, said discharge circuit conveying vaporous heat transporting medium from the Ruths storage device to the superheat storage device and subsequently to the heat sink and returning heat transporting medium condensed by the heat sink in liquid form to the liquid bath of said Ruths storage device.

3. A heat storage system as defined in claim 2, further comprising a discharge pump in the discharge circuit.

4. A heat storage system as defined in claim 1, further comprising a charge circuit including said heat source and said superheat storage device as well as the Ruths storage device, said charge circuit conveying liquid heat transporting medium from the liquid bath of the Ruths storage device to the heat source and returning heat transporting medium vaporized by the heat source through the superheat storage device to the Ruths storage device, and passing this to the liquid bath of the Ruths storage device for condensation.

5. A heat storage system as defined in claim 4, further comprising a charging pump in the charge circuit.

6. A heat storage system as defined in claim 1, further comprising a connecting line between the heat source and the heat sink.

7. A heat storage system for storing heat from a heat source and transferring the heat using a heat transporting medium to a heat sink such as a steam-powered engine that operates with overcritical steam of said heat transporting medium, said heat storage system comprising:
- a Ruths storage device for storing said heat transporting medium condensed in the form of a liquid bath, said Ruths storage device having a latent heat storage material arranged in said liquid bath and a storage temperature below a critical temperature of said heat transporting medium, and
- a superheat storage device connected with said Ruths storage device and having a storage temperature above the critical temperature of the heat transporting medium;
- said heat storage system having a discharge cycle in which the Ruths storage device provides steam from the liquid bath of said heat transporting medium with a temperature corresponding to the storage temperature of the Ruths storage device, said steam subsequently flowing through the superheat storage device to be heated to a temperature above the critical temperature for input to the heat sink.

8. A heat storage system a defined in claim 7, wherein said superheat storage device is a latent heat storage device.

9. A heat storage system as defined in claim 7, wherein said heat source is fed by solar energy.

10. A heat storage system as defined in claim 9, wherein said heat source is a receiver of solar concentrators.

11. A heat storage system as defined in claim 7, further comprising an additional storage device associated with said Ruths storage device for liquid heat transporting medium maintained at the storage temperature of the Ruths storage device, wherein during discharge of the Ruths storage device liquid heat transporting medium is supplied for the additional storage device to the liquid bath such that the liquid bath, during discharging, always surrounds the latent heat storage material essentially with heat contact, and wherein vaporized heat transporting medium flows through the superheat storage device for subsequent heating before it enters the heat sink.

12. A heat storage system as defined in claim 11, further comprising an additional pump between the additional storage device and the Ruths storage device in order to convey liquid heat transporting medium to the liquid bath from the additional storage device.

13. A heat storage system as defined in claim 11, wherein during charging of the Ruths storage device, the additional storage device can be filled with liquid heat transporting medium at the storage temperature of the Ruths storage device.

14. A heat storage system as defined in claim 13, wherein liquid, condensed heat transporting medium can be introduced into the additional storage device from the Ruths storage device.

15. A heat storage system as defined in claim 11, wherein during charging, condensed heat transporting medium can be supplied to the heat source from a condensate tank, and wherein heat transporting medium vaporized by the heat source can be introduced into the Ruths storage device for condensation via a charge line through the superheat storage device.

16. A heat storage system as defined in claim 11, wherein a condensate feed line is provided between the heat sink and the heat source and condensed heat transporting medium is transportable in this line to the heat source.

17. A heat storage system as defined in claim 16, wherein the condensate tank for the condensed heat transporting medium is provided in the condensate feed line in the heat sink.

18. A heat storage system as defined in claim 7, wherein said Ruths storage device is operable such that the liquid bath of the heat transporting medium always surrounds said latent heat essentially with heat contact therewith during said discharge cycle.

19. A heat storage system for storing heat from a heat source and transferring the heat using a heat transporting medium to a heat sink such as a steam-powered engine that operates with overcritical steam of said heat transporting medium, said heat storage system comprising:
- a Ruths storage device for storing said heat transporting medium condensed in the form of a liquid bath, said Ruths storage device having a latent heat storage material arranged in said liquid bath and a storage temperature below a critical temperature of said heat transporting medium,
- a superheat storage device connected with said Ruths storage device and having a storage temperature above the critical temperature of the heat transporting medium;

said heat storage system having a discharge cycle in which the Ruths storage device provides steam from the liquid bath of said heat transporting medium with a temperature corresponding to the storage temperature of the Ruths storage device, said steam subsequently flowing through the superheat storage device to be heated to a temperature above the critical temperature for input to the heat sink; and said Ruths storage device having an additional storage volume for liquid heat transporting medium, the liquid transporting medium entering said additional storage volume when during a charging cycle the latent heat storage material is surrounded by said liquid bath essentially with heat contact;

wherein during said discharge cycle the maximum amount of the liquid heat transporting medium vaporizable in the Ruths storage device is such that the additional storage volume is emptied with the liquid bath always surrounding the latent heat storage material still essentially with heat contact.

20. A heat storage system as defined in claim 19, wherein condensed heat transporting medium can be supplied to the heat source from a condensate tank and wherein heat transporting medium vaporized by the heat source can be introduced into the liquid bath of the Ruths storage device by means of a charge line through the superheat storage device.

21. A heat storage system as defined in claim 19, further comprising a discharge line for supplying vaporous heat transporting medium from the additional storage volume of the Ruths storage device to the heat sink.

22. A heat system as defined in claim 19, further comprising a condensate feed line between the heat sink and the heat source for supplying condensed heat transporting medium to the heat source.

23. A heat storage system as defined in claim 22, further comprising a condensate tank in the condensate feed line.

24. A heat storage system as defined in claim 22, further comprising a charging pump in the condensate feed line.

* * * * *